July 25, 1944.    F. MESINGER    2,354,328

CYCLE SADDLE SPRING

Filed July 12, 1940

INVENTOR.
FREDERICK MESINGER
BY
William F. Mesinger
ATTORNEY.

Patented July 25, 1944

2,354,328

UNITED STATES PATENT OFFICE 2,354,328

CYCLE SADDLE SPRING

Frederick Mesinger, Mount Vernon, N. Y.

Application July 12, 1940, Serial No. 345,057

2 Claims. (Cl. 155—5.22)

This invention relates to cycle saddles and more particularly to a cycle saddle spring joint construction.

A customary form of seat supporting spring structure for cycle saddles includes a coil spring arrangement for supporting the rear portion of the seat, a frame including forwardly and rearwardly extending reach members which are connected with and support the rear coil springs, and a coil spring arrangement connecting the front ends of the reach members to the forward or pommel portion of the seat. The front spring has helical coils disposed in vertical planes, a center portion, and upper and lower end portions that extend rearwardly and are secured to the seat and to the reach members respectively. It has been customary to secure the lower end portions of the spring by passing a bolt or rivet through eyes formed by the end portions and holes through the end portions of the reach members. Such connection was intended to provide a hinge action.

According to the present invention however, the joint between the reach members and the front spring is arranged so that any hinge action between the members and the spring is prevented. It has been found that such rigid joint causes all the hinge action between the reach members and the seat to occur by flexure of the spring and has the advantages of providing an improved spring action of the seat support, of obtaining resilient cooperation between the front spring and the rear springs. avoiding any lost motion. improving the stability of the seat support, and eliminating the possibility of annoying squeaks or the necessity of oiling the joint.

The principal objects of the invention are therefore to provide an improved saddle seat supporting spring arrangement; to provide an arrangement preventing hinge like action between a front spring and the reach members of the spring frame; and to provide such a construction which shall be simple and economical to manufacture.

These and other objects will become evident in connection with the following description taken in connection with the attached drawing in which.

Figure 1:
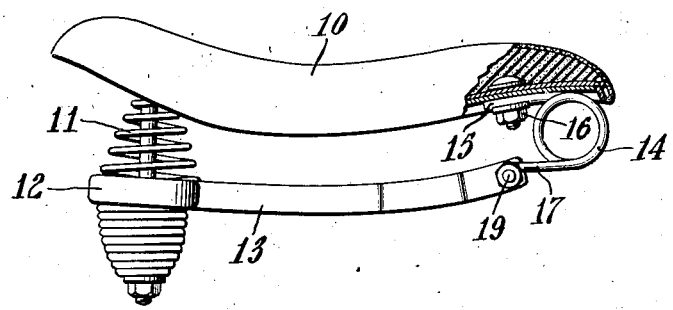
Fig. 1 is an elevational view of a saddle having rear coil springs and a front coil spring rigidly secured to the reach members of the frame.
Figure 2:
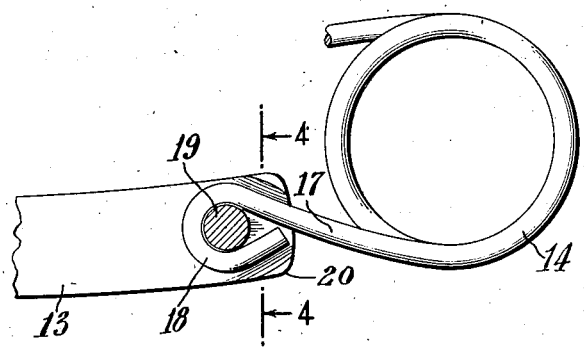
Fig. 2 is a detailed side view on an enlarged scale of the joint according to the invention.
Figure 3:
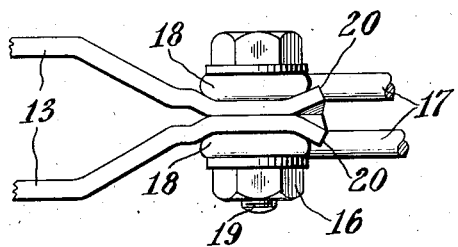
Fig. 3 is a fragmentary plan view of the joint on an enlarged scale.
Figure 4:
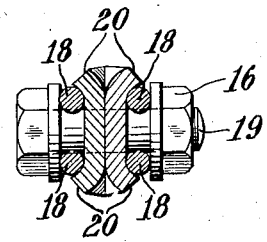
Fig. 4 is a view of a section taken on the line 4—4 of Fig. 2.

Referring particularly to Fig. 1 the saddle is provided with a customary form of padded seat 10 supported at its rear portion by two sets of helical coil springs 11. The springs 11 are supported by a frame including spring supports 12 and a pair of reach members 13 that extend forwardly. The members 13 are preferably made of bar stock of rectangular cross-section the longer dimension of which is vertical.

The forward or pommel portion of the seat 10 is supported on a helical torsion spring 14 having a rearwardly extending central loop 15 secured against the bottom of the seat 10 by a bolt 16. Each half of the spring may include a turn and a half or more or less of spring wire, the turns being disposed in the vertical plane. The two lower end portions 17 of the spring are provided with pear shaped loops or eyes 18 also in the vertical plane. The forward portions of the reach members 13 are bent toward each other so that end portions contact each other and are disposed in parallel vertical planes between the eyes 18. A bolt 19 passing through the eyes 18, and the end portions of the reach members 13 secures the eyes and reach members closely together. Obviously however a rivet could be employed if desired.

The joint is made rigid by upsetting or forming portions of the ends of the reach members 13 outwardly as shown at 20 to engage portions of the upper and lower sides of the eyes 18. Since the eyes 18 are not circular the outstanding projections 20 will effectively prevent relative rotation between the eyes 18 and the reach members 13. In effect the contour of the eyes is pressed into the outer sides of the end portions of the reach members.

It will be seen that as the rear springs 11 are compressed the entire hinge action will occur in the front spring which will thereby cooperate smoothly with the rear springs. There will be no moveable joint to cause instability or to squeak.

I claim:

1. In a cycle saddle, a seat; a pair of forwardly and rearwardly extending reach members having rectangular bar shaped forward end portions in vertical parallel planes; a spring having a portion rigidly secured to the forward portion of said seat and rearwardly extending end portions having non-circular eyes disposed in parallel vertical planes; securing means passing through said eyes and said reach members for securing said end portions to the forward ends of said reach members; and integral portions struck up from the edges of said reach members to simultaneously engage both upper and lower non-circular portions of said eyes for preventing relative rotational movement in either direction between said eyes and said reach members.

2. In a cycle saddle, a seat; a pair of forwardly and rearwardly extending reach members having rectangular bar shaped forward end portions, said end portions being in contact and having outer faces in parallel vertical planes; a spring having a portion rigidly secured to the forward portion of said seat and rearwardly extending end portions having non-circular eyes disposed in parallel vertical planes; a single securing means passing through said eyes and said forward portions of said reach members for securing said eyes against said outer faces of the forward portions of said reach members; and integral projections extending outwardly from said outer faces of the reach members to engage the non-circular portions of said eyes for preventing relative rotational movement in either direction between said eyes and said reach members.

FREDERICK MESINGER.